Sept. 9, 1924.  
G. H. F. HOLY  
1,508,226
MOTOR SUSPENSION STRUCTURE
Filed Nov. 13, 1919
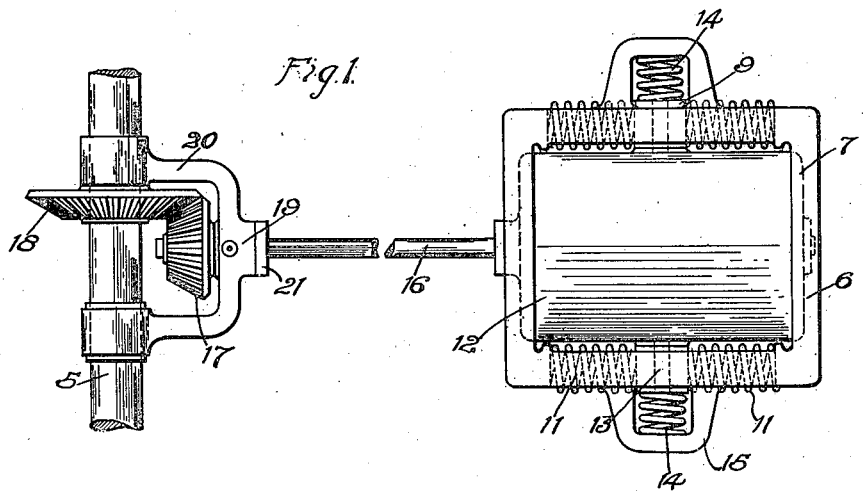
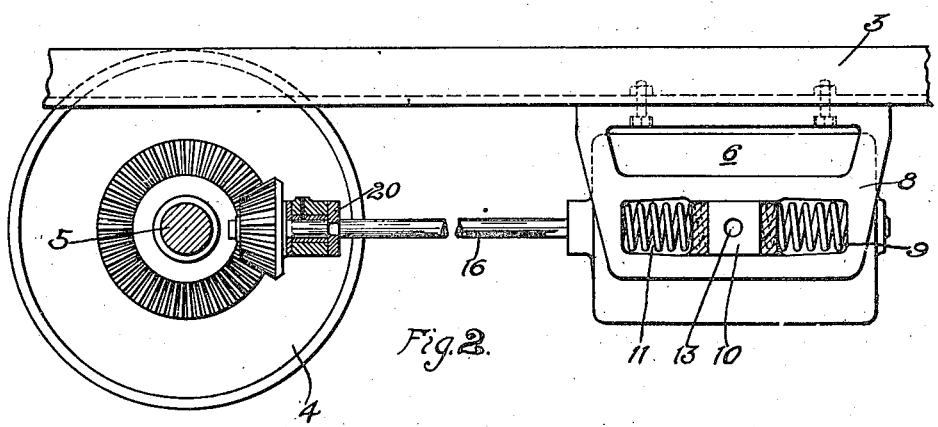
WITNESSES:  
J. B. Merrill  
F. A. Lind.
INVENTOR  
George. H. F. Holy  
BY  
Wesley G. Carr  
ATTORNEY Patented Sept. 9, 1924.

1,508,226

UNITED STATES PATENT OFFICE.

GEORGE H. F. HOLY, OF PITTSBURGH, PENNSYLVANIA, ASSIGNOR TO WESTINGHOUSE ELECTRIC & MANUFACTURING COMPANY, A CORPORATION OF PENNSYLVANIA.

MOTOR SUSPENSION STRUCTURE.

Application filed November 13, 1919. Serial No. 337,848.

*To all whom it may concern:*

Be it known that I, GEORGE H. F. HOLY, a citizen of the United States, and a resident of Pittsburgh, in the county of Allegheny and State of Pennsylvania, have invented a new and useful Improvement in Motor Suspension Structures, of which the following is a specification.

My invention relates to motor-driven vehicles and it has particular relation to the means for mounting the dynamo-electric machines thereon.

One object of my invention is to provide a dynamo-electric-machine suspension structure that shall permit mounting the motor on the body of the vehicle and the driving of the vehicle wheels directly from the motor. Another object of my invention is to provide a suspension device particularly adapted for light-weight cars that shall be compact, rugged, simple, and inexpensive to manufacture.

In the accompanying drawings, Fig. 1 is a plan view of a dynamo-electric-machine-suspension device constructed in accordance with my invention; and Fig. 2 is a side elevational view of the same mounted upon a vehicle body; parts being broken away for the sake of clearness.

By my invention, I provide a suspension device by means of which the motor may be mounted on the car body at a fixed distance from the wheel axis and by means of which relative displacement, in any direction in a horizontal plane of the car body, with respect to the wheels, is absorbed by the suspension device without, in any way, changing the relative positions of the motor and the wheels to which it is operatively connected, and wherein vertical movement of the car body with respect to the wheels will cause a pivotal movement of the motor about an auxiliary axis whereby the annular disposition of the motor with respect to the car wheels will remain unchanged.

For a more detailed description of my invention, reference may now be had to the drawings in which is shown a portion of a car body 3 mounted upon a pair of wheels 4, only one of which is shown, by means of bearings (not shown) on an axle 5. Upon the car body 3 is rigidly mounted a motor-supporting structure 6, which may consist of a casting having a flat central body portion 7 and two spaced downwardly projecting side members 8, each of which is provided with a longitudinally extending horizontal slot 9. A journal member 10 is movably mounted within each of the slots 9 and is resiliently restrained from moving therefrom by means of two compression springs 11, respectively disposed at the sides of the journal member 10.

A motor 12 is mounted on the journal members 10 by means of pivots 13. Lateral movement of the motor, with respect to the car body, is permitted by lateral movement of the journal members 10 within the slots 9 and is resiliently restrained from moving therefrom by means of two compression springs 14, respectively disposed at the outer sides of the journal members. Each of the springs 14 is held in engagement with its journal member 10 by means of a lug 15, which is an integral part of the side member 8 of the motor-supporting structure 6.

The motor 12 is provided with a shaft 16 to which is attached a bevel gear 17 to mesh with a coacting bevel gear 18, mounted on the axle 5 to drive the same. The shaft 16 and the gear 17 are held in the proper position with respect to the gear 18 by means of a bearing 19 in which the shaft 16 is journaled and which is mounted upon a member 20 of substantially U shape, the legs of which are journalled upon the axle 5. Movement of the shaft 16 towards the wheel axle is prevented by a thrust collar 21.

From the foregoing description, it will be apparent to those skilled in the art that vertical movement of the car body with respect to the wheels will cause the motor to move about the wheel axis as a center, since the distance between the gear 17 and the motor is fixed, and to turn about the pivots 13 so that the axis of the motor passes through the axis of the wheel axle. Since the motor must move about the axle of the wheels as a pivot, the springs 11, intermediate the journal members 10 and the wheels 4, will be compressed slightly. While I have shown but a single shaft connecting the rotor of the motor to the gear 18, for simplicity, it will be customary in practice to connect a short motor shaft to the gear 18 through an intermediate shaft and a coupling member.

Movement of the car body with respect to the wheels in a longitudinal direction will cause the journal members 10 to move in the slots 9, compressing the one or the other of the springs 11, as the distance between the motor and the wheel axle is fixed. Lateral movement of the car body with respect to the wheels will cause one of the springs 14 to be compressed, as the motor is always maintained in alinement with the gear 17.

Thus it will be seen that, by my invention, movement of the car body with respect to the wheels in any direction may occur without, in any way, interfering with the driving connection between the motor and the wheels, and further, that I have provided a compact, durable and simple structure whereby the motor is movable mounted on the car body and is resiliently held in position with respect thereto.

While I have shown but one form of my invention and have described in detail but one application of the same, it will be obvious to those skilled in the art that it is not so limited but that many variations and modifications thereof may be made without departing from the spirit thereof, and I desire therefore, that only such limitation shall be imposed thereon as are set forth in the appended claims.

I claim as my invention:

1. In combination, a car body mounted on a pair of wheels, a motor-supporting structure fixedly mounted on said car body; journal members mounted on and movable both longitudinally and transversely of the said supporting structure, and a motor operatively connected to said wheels and pivotally mounted on said journal members.

2. In combination, a car body mounted on a pair of wheels, a motor-supporting structure fixedly mounted on said car body, two journal members mounted in spaced relation on said supporting structure, and a motor operatively connected to said wheels and mounted on said journal members by means of horizontal pivot shafts, said shafts being transversely movable with respect to the car body.

3. In combination, a car body mounted on a pair of wheels, a motor-supporting structure fixedly mounted on said car body, two journal members movably mounted in spaced relation on said supporting structure, resilient means for holding said journal members in position laterally with respect to said supporting structure, and a motor operatively connected to said wheels and pivotally mounted on said journal members.

4. In combination, a car body mounted on a pair of wheels, a motor-supporting structure fixedly mounted on said car body, two journal members mounted in spaced relation on said supporting structure and horizontally movable with respect thereto, springs on three sides of said journal members for holding said members in position, and a motor intermediate said journal members and engaging the fourth side of each, said motor being pivotally mounted on said journal members and being connected to drive said wheels.

5. In combination, a car body mounted on a pair of wheels, a motor-supporting structure fixedly mounted on said car body, two journal members mounted in spaced relation on said supporting structure, and a motor operatively connected to said wheels and mounted on said journal members by means of horizontal pivot shafts, said shafts being both longitudinally and transversely movable with respect to the car body.

6. In combination, a car body mounted on a pair of wheels, a motor-supporting structure fixedly mounted on said car body, two journal members movably mounted in spaced relation on said supporting structure, resilient means for holding said journal members in position laterally and longitudinally with respect to said supporting structure, and a motor operatively connected to said wheels and pivotally mounted on said journal members.

In testimony whereof, I have hereunto subscribed my name this 31st day of Oct. 1919.

GEORGE H. F. HOLY.